United States Patent [19]

Carson et al.

[11] Patent Number: 4,629,832
[45] Date of Patent: Dec. 16, 1986

[54] COMMUNICATION SYSTEM ADMINISTRATION METHOD AND CIRCUITRY

[75] Inventors: Robert A. Carson, Indianapolis, Ind.; Mary S. Petrick, Jamesburg, N.J.; Lee A. Vallone, Red Bank, N.J.; John D. Walker, Middletown, N.J.

[73] Assignee: AT&T Information Systems Inc., Holmdel, N.J.

[21] Appl. No.: 649,118

[22] Filed: Sep. 10, 1984

[51] Int. Cl.⁴ .................. G05B 23/02; H04M 3/22
[52] U.S. Cl. .................... 340/825.07; 379/201; 379/381
[58] Field of Search ........ 179/18 AD, 18 ES, 18 AB, 179/18 BD, 18 BE, 175.2 C, 18 D, 18 BF; 340/825.06, 825.07, 825.5, 825.52

[56] References Cited

U.S. PATENT DOCUMENTS 3,549,816 12/1970 Fenstermaker et al. ......... 179/27 D
3,689,702 9/1972 McCay ............................. 179/18 BE
3,867,582 2/1975 Weed et al. ..................... 179/18 BE
3,928,735 12/1975 Kennedy ....................... 179/175.3 R
4,196,316 4/1980 McEowen et al. ............. 179/18 ES
4,475,009 10/1984 Rais et al. ........................... 179/2 A

OTHER PUBLICATIONS

"Horizon ® Communication System: Custom Service for Small Businesses", R. R. Desjardins, J. A. Miller and C. D. Weiss, *Bell Laboratories Record*, vol. 55, No. 10, Nov. 1977, pp. 271-275.

Primary Examiner—Thomas W. Brown
Attorney, Agent, or Firm—John A. Caccuro

[57] ABSTRACT

The present administration arrangement disables any idle system apparatus which would be affected by the administration changes being made. In the station administration mode once the selected station is idle it is held in a forced idle state until administration is completed. During the system administration mode all idle stations are held in the forced idle state and all idle central office lines are placed in a forced busy state until system administration is completed. Station visual and audible signals indicate the administration status to system users. At the conclusion of administration, any forced idle stations and forced busy central office lines are returned to the normal state.

20 Claims, 7 Drawing Figures

FIG. 7 TYPE OF BUTTON PRESSED

|  | DSS | LINE | MODE | DIAL CHAR |
|---|---|---|---|---|
| ADM START | ERROR | ERROR | ENTER ADM STA WAIT OR ADM POOL WAIT | ERROR |
| STA WAIT | WHEN STA IDLE GO TO ADM STA | ERROR |  | WHEN STA ENTRY COMP AND STA IDLE GO TO ADM STA |
| ADM STA | NEW STATION TO ADM | CHANGE LINE ADM |  | WHEN COMPLETE NEW STA TO ADM |
| POOL WAIT | ERROR | ERROR |  | ERROR |
| ADM POOL | ERROR | CHANGE LINE STATUS IN POOL | ↓ | WHEN COMPLETE NEW POOL | utilzied, respectively, for storing program instructions to implement the present administration feature and the data associated therewith.

FIG. 2 shows a typical terminal or station set for use with the communication system shown in FIG. 1. The station set is connected to common controller by a 4 pair cable 201. Two of the pairs provide two voice channels, one pair provides for station set power, and one pair provides control signals. The station set signaling over the control pair is described in copending U.S. Patent application Ser. No. 443,392, filed by T. H. Judd on Nov. 22, 1982, now U.S. Pat. No. 4,454,383 issued on June 12, 1984. The station set includes mode select switch 201 used to select the programming or station administration mode of operation. In one embodiment, during the administration mode of operation, several buttons of a preselected control station assume different functions. For example, button 202 becomes the pool administration button (ADM POOL), button 203 becomes the station administration button (ADM STA), button 204 becomes the miscellaneous administration button (ADM MISC), button 205 becomes the toll administration button (TOLL), and button 206 becomes the night service administration button (NGHT SRV). The red light-emitting-diode (LED) and green LED associated with each of these buttons provides visual signals to indicate to the user the status while in the various administration modes. An audio output provides additional status and alert signal to the administrator or user. The key pad 207 provides the entry of station numbers and other data during any of the administration modes. Since the operation of the other buttons and LEDs of the station set are not relevant to the present invention, they are not described herein. It should be noted that a direct station select (DSS) capability may be incorporated as part of the station set or can be provided by a separate unit. This DSS capability can be used to enter station numbers directly.

FIG. 3 shows an embodiment of the software architecture utilized in the system shown in FIG. 1. A more detailed description of the command flow in the control module software can be found in copending U.S. Patent Application Ser. No. 523,092, filed by Carson et al on Aug. 15, 1983, now U.S. Pat. No. 4,560,837 issued on Dec. 24, 1985. To facilitate the addition of or changes to system operating features, the system is partitioned into a feature program (FP) module 31 and a personality program (PP) module 32. Both the feature program and personality program reside in ROM 108.

The following paragraphs provide a background for understanding the disclosed system/station administration arrangement operation in the embodiment of the software architecture block diagram shown in FIG. 3. The software block diagram of FIG. 3 shows the feature program as including call director 301, administration translation director 311, a group of terminal managers 302-1 through 302-N, and the terminal feature dependent parts of the group of terminal adapters 303-1 through 303-N. The disclosed administration arrangement requires one terminal manager and terminal adapter to interface each station set ST1-STN of FIG. 1. FIG. 3 also includes translation manager 314 and translation adapter 313 for accessing inputs from switches on control translation 114 of FIG. 1. Additionally, terminal manager 302-1 includes a terminal manager administrator (TMA) program 312 which enables the station set ST1 serviced by I/O adapter 306-1 to act as the central administration position CAP.

In FIG. 3, the personality program includes network manager 304, network adapter 305, line managers 207-1 through 207-M and a variety or apparatus adapters including line adapters 308-1 through 308-M, paging manager 309, paging adapter 310 and the input/output portion of the terminal adapters 306-1 through 306-N. These apparatus adapters of the personality program are hardware dependent modules, also known as hardware driver programs, which interface the system to the specific apparatus or hardware (e.g., station sets ST1-STN line circuits 102, etc.). These apparatus adapters are responsive to control commands for enabling or disabling communications with the connected apparatus.

Network adapter 305 receives hardware status from and transmits hardware stimuli to switch network 101. The network adapter decodes requests, updates network hardware status, and generates call progress tones. The network adapter converts the raw hardware dependent variables into a hardware independent language for communication to network manager 304. Thus, network adapter 305 translates specific hardware signals to and from functional language commands to make or clear connections to specified ports or links of the network.

Line adapters 308-1 through 308-M scan the CO line circuits 102 for changes in the state of the CO lines (CO1-COM) and report any changes in a hardware independent language to the associated line managers 307-1 through 307-M. Each line adapter receives commands from its line manager which are decoded and executed in hardware dependent language. Thus, each line adapter and associated line manager interface each CO line to the system. This line interface generates and receives hardware signals which enable the system to perform the standard CO line functions such as conferencing, queuing, dialing, disconnection, holding, outpulsing, timed flash, seizing, busying out and tone signaling.

Similarly, paging adapter 310 receives and outputs hardware stimuli to interface to various paging devices. Paging manager 309 receives and transmits device independent commands to control paging adapter 310.

Terminal I/O adapters 306-1 through 306-N interface station sets ST1-STN with control logic 102. Control logic 102 includes circuitry which periodically polls the connected station sets ST1-STN (or other voice or data communication devices) and receives status therefrom. Each of the terminal adapters receives information from an associated station set which is consolidated from a polling operation performed by control logic 102. This information includes various arguments to specify the call priority, station identification, button type, and button identification. Each of the terminal I/O adapters 306-1 through 306-N converts this hardware-dependent information or signals into a hardware-independent language which is communicated to the associated hardware-independent terminal adapters 303-1 through 303-N. The communications or commands between the terminal managers 302-1 through 302-N and terminal adapters 303-1 through 303-N updates various visual, audible and button states of the station sets connected to the system. These commands turn off, turn on, flutter, wink, or flash the red or green light-emitting diode of the station sets, or enable voice or tone signaling from the station sets. One method of providing the tone signaling at the station sets is disclosed in copending U.S. Patent application Ser. No. 443,391, filed by T. H. Judd

COMMUNICATION SYSTEM ADMINISTRATION METHOD AND CIRCUITRY

TECHNICAL FIELD

This invention relates to telephone communication systems, and more particularly, to a method and apparatus for disabling only idle system apparatus to be affected by system administration.

BACKGROUND OF THE INVENTION

System administration is the method by which a customer can tailor or change a communication system (e.g., assign personal lines, calling features, monitor usage, replace circuit cards, etc.) to meet his or her needs. In some prior systems, system administration required that the system be powered-down before any system reconfiguration be performed. To accomplish this the system administrator would have to tell all of the system users when the system was going to be down and would terminate all active calls at that time. Disadvantageously, this approach resulted in significant interruptions in system operation.

In another type of system, when station administration is required, the system administrator makes the changes piecemeal, a station feature at a time. Each change being made when the equipment associated with that feature becomes idle and additional changes not being made until the previous change is completed. In such a system, line administration changes are also accomplished piecemeal, a facility at a time. Because of this piecemeal approach the changes may require significant amounts of time to complete and additionally may result in some system communications occurring with an incompletely configured system.

SUMMARY OF THE INVENTION

According to the present invention, system administration is accomplished by disabling any idle system apparatus affected by the system administration changes being implemented until all the system apparatus needed to implement the changes have been disabled, making the system administration changes required, and reenabling the disabled system apparatus. More particularly, in one embodiment, as each station goes idle, it is held in a forced idle (FI) state until all stations are in the FI state. When each central office (CO) line becomes idle it is placed in a forced busy (FB) state until all CO lines are placed in the FB state. Thereafter, system administration changes are made. After all the changes are completed, all stations are removed from the FI state and all CO lines removed from the FB state. During the FI and FB states appropriate audio and visual indications are given to alert system users. System administration is accomplished by disabling only the apparatus which is to be effected, thereby minimizing inconvenience. This type of system administration also prevents any user communications using an incompletely administered system.

BRIEF DESCRIPTION OF THE DRAWING

The detailed description of the invention will be more fully appreciated from the illustrative embodiment shown in the drawing, in which:

FIGS. 6 and 7 show various data and status tables to implement the invention;

GENERAL DESCRIPTION

Before describing the present invention, it may be helpful to generally describe the operation of a telephone communication system in which the claimed administration feature or mode may be utilized. It should be recognized that the present invention may be utilized in other similar type communication systems. Since such systems utilize a variety of hardware and programming techniques, no attempt is made to detail the entire program used to control the communication system. However, the disclosed call administration feature must be blended into the overall program structure of the system in which it is used and must be tailored to mesh with other features and operations of the system. Thus, in order to avoid confusion and in order to enable those skilled in the art to practice the claimed invention, this specification will describe the operation of the disclosed administration feature using flow charts which describe the logical steps and the various parameters required to implement the invention.

Figure 1:
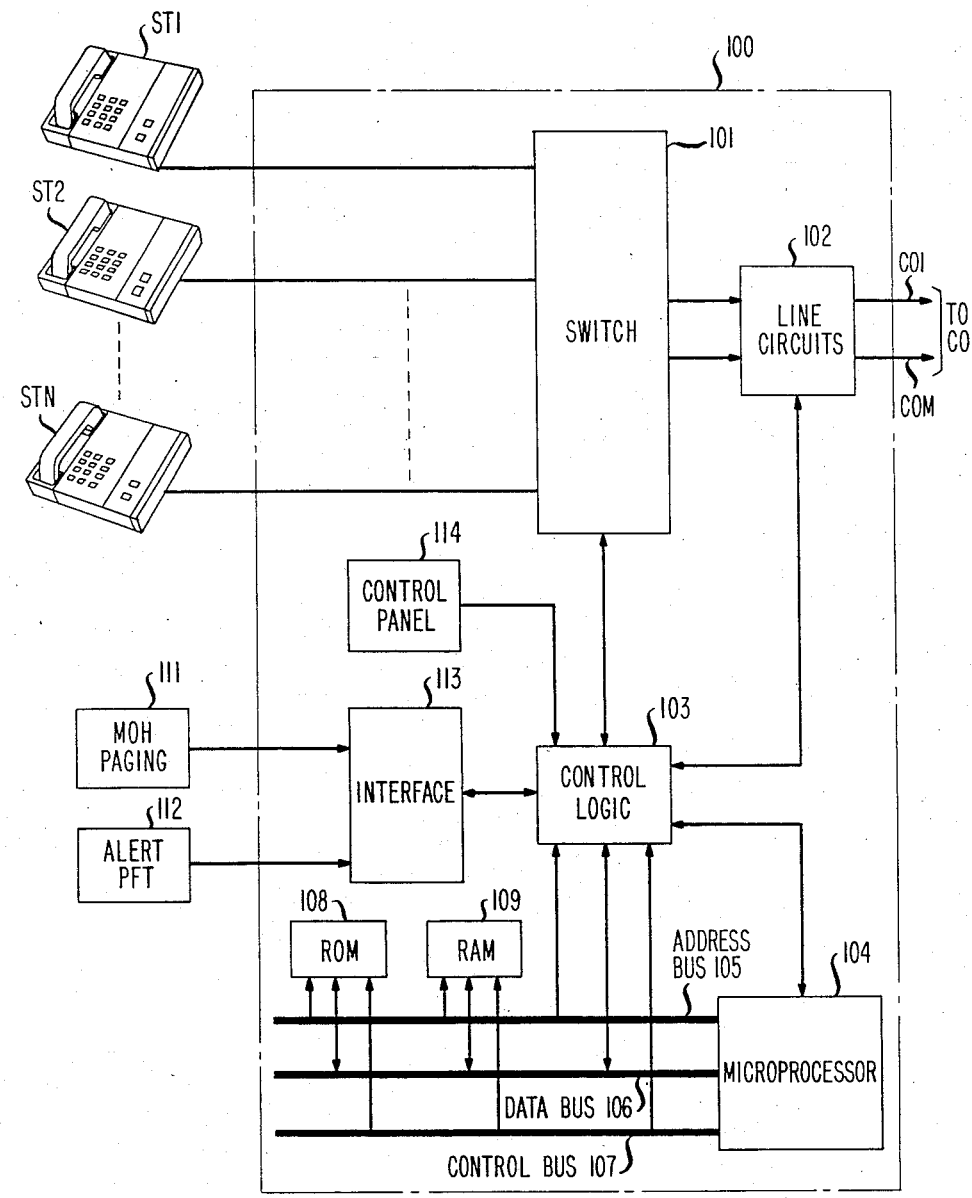
FIG. 1 is a block diagram of a communication system utilizing the invention.
Figure 2:
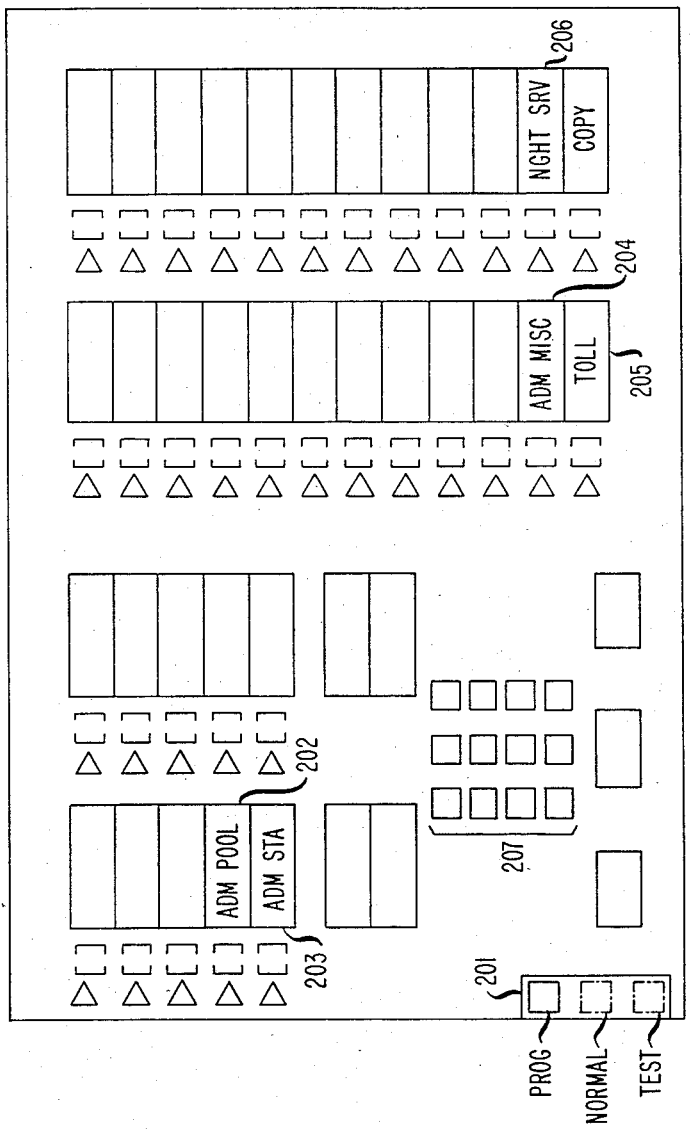
FIG. 2 is a station set used with the communication system of FIG. 1.
Figure 3:
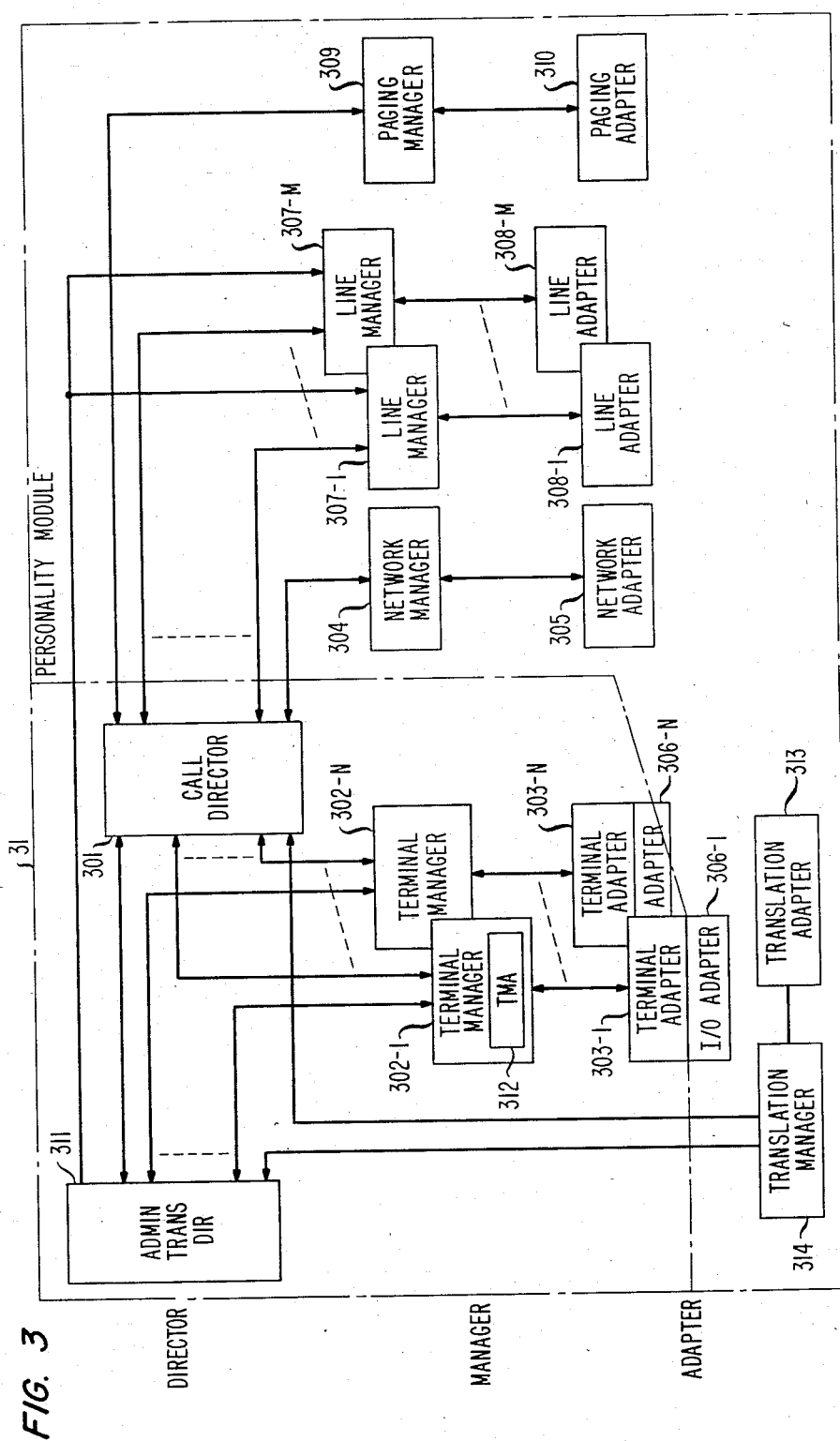
FIG. 3 is a block diagram of the software architecture of the communication system of FIG. 1.

FIG. 1 shows a block diagram of a communication system useful in describing the present invention. The communication system of FIG. 1 accommodates up to N telephone lines connected to terminals or station sets, ST1-STN, and M central office (CO) lines, CO1-COM, which connect to common controller unit 100. It should be noted that while the embodiment of the hardware shown in FIG. 1 represents an embodiment, the described invention can be utilized in many other program controlled communication systems. Common controller 100 establishes and controls all intercom and central office communications involving the station sets. Controller 100 includes switch 101 which operates in response to signals from control logic circuit 103 to establish a communication connection between station sets ST1-STN and CO lines CO1-COM, via line circuits 102. Controller 100 also includes interface 113 which interfaces control logic circuit 103 to a music-on-hold and paging circuit 111 and an external alert circuit 112. Additionally controller 100 includes a control panel 114 to enable the user to select various operating modes, including the present administration mode, via switches.

Control logic circuit 103 provides in a well-known manner various system timers, programmable tone generators, network control logic, and signals for selecting and controlling system communication connections in response to commands received from microprocessor 104. Microprocessor (CPU) 104 is connected via address bus 105, data bus 106 and control bus 107 to read-only-memory (ROM) 108, random-access-memory (RAM) 109 and control logic 103.

It should be noted that microprocessor 104 receives program instructions from ROM 108 to perform in a well-known manner the features and functions of the communication system. Memory, RAM 109, is utilized for storing and accessing user generated data associated with performing the desired function programmed in ROM 108. Memory ROM 108 and RAM 109 also are et al on Nov. 22, 1982, now U.S. Pat. No. 4,477,697 issued on Oct. 16, 1984.

The comunications between the network manager 304, terminal managers 302-1 through 302-N, line manager 307, paging manager 309, call director 301, and administration translation director (ATD) 311 utilize well-known program calls or commands which identify the program to be called to perform the requested function. The program call also includes the various arguments which specify the parameters necessary to carry out the function. Program calls have the form FCN (A1, A2, A3, A4) where FCN is a mnemonic for the function being called and A1-A4 are the various arguments or parameters of the function call. Appropriate arguments such as the call identification, (CID); station, (SID); CO facility, (FID); resource, (RID); status, (ST); etc. may be included with each program call.

In a well-known manner the operating system of microprocessor 104 of FIG. 1 receives the program call and the associated arguments and sets its program counter to the address of the program FCN and starts to sequentially execute the instructions of the program to perform the desired function.

DETAILED DESCRIPTION

The present invention describes a method for allowing system administration to proceed efficiently with a minimum of inconvenience to system users. This is accomplished by not disabling any part of the system not affected by the present administration and not disabling the affected parts until they become inactive. The following is a detailed description of a set of administration procedures which embody the present invention.

To initiate or enter the administration mode the user must make a selection at both the common controller unit 100 and at the CAP location ST1. The system administrator or user must first set the Administration/Security Mode switch on control panel 114 of controller unit 100 to the Administration position and then set the Test/Normal/Program Mode switch 201 at the CAP location ST1 to the Program Mode. While there is a sequence for setting the switches in the disclosed embodiment, this is a design choice and not a requirement of the present invention. Obviously, if desirable, the disclosed invention can be modified in a straightforward manner so that multiple station sets or all station sets can be used as CAP locations. Obviously, other apparatus such as buttons, dial codes, etc. could be used to initiate and/or terminate the administration mode.

In response to these inputs the system sends commands which cause the red and green LEDs next to the ADM POOL, ADM STA, ADM MISC, TOLL AND NGHT SRV buttons to flash alternately to indicate the various types of system administration that can now be performed. The particular type of administration desired is initiated by depressing the appropriate mode button at the CAP location station set ST1. The present mode can be re-entered at any time during administration by depressing the button corresponding to the mode the administrator is currently in. Pressing a different mode button causes the current administration mode to be exited and the new mode entered. Any time a user depresses a button that is not valid for the current administration mode, an error audible sounds. This also applies to illegal station numbers, pool access codes and administration pound codes. The error audible will not sound while waiting for a station or the system to enter the Forced Idle Mode.

Figure 4:
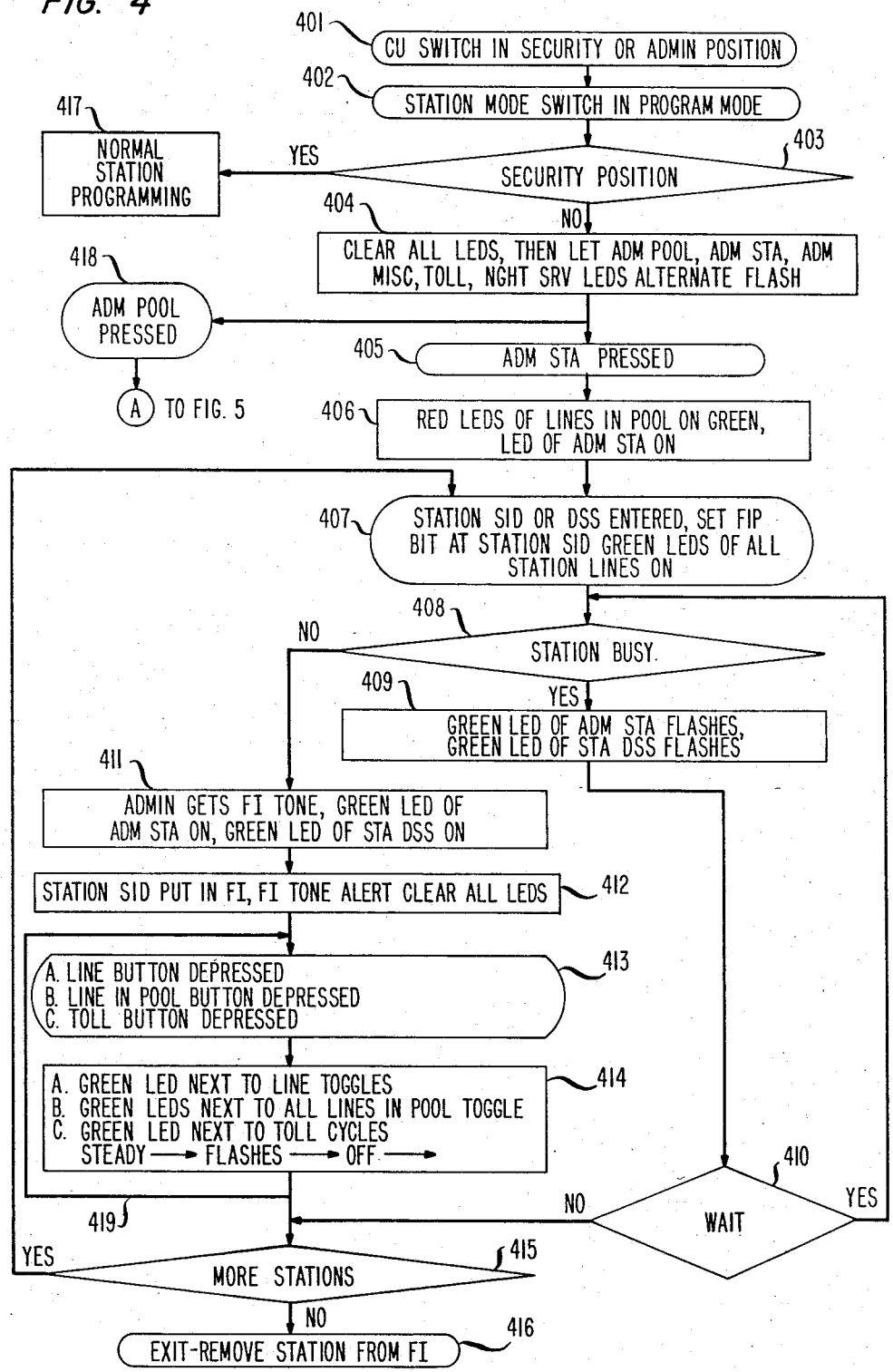
FIGS. 4 and 5 show flow charts of the various control steps used to implement the invention.
Figure 5:
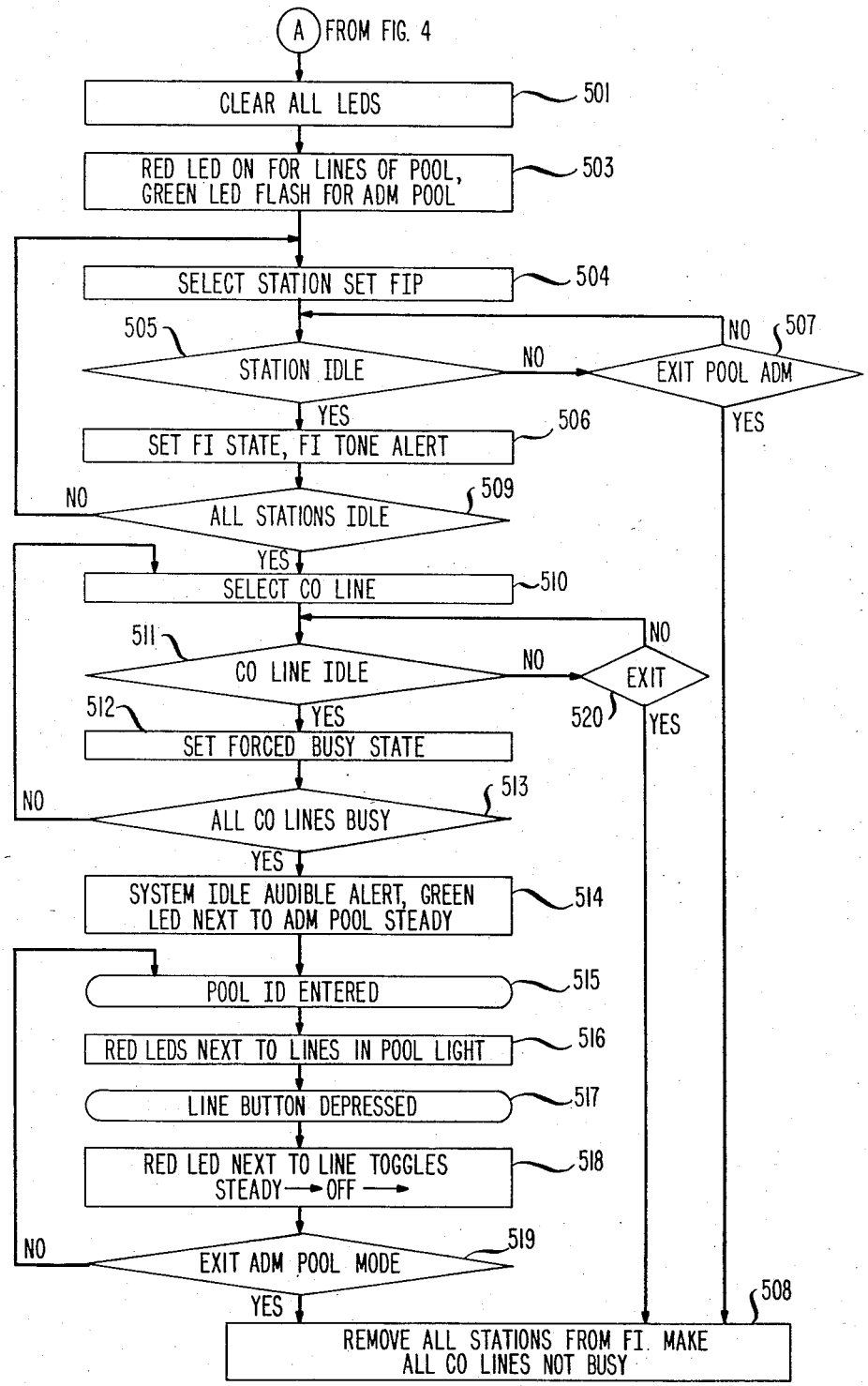

The detailed operation of the present invention will be described with joint reference to FIGS. 1-5. When reference is made to a number designation, the first number of that designation refers to the figure containing that designated reference. In FIG. 4 the boxes with rounded corners (e.g., 401) are inputs to the system provided by the administrator or user located at the CAP location (i.e., station ST1). The boxes with square corners (e.g., 404) are the system visual and audible outputs provided to the CAP station set ST1 or other station sets.

As noted, the control unit (CU) includes a mode select switch on control panel 114 which can be placed in the administration mode or security mode position, 401. This switch is used by the system to determine if the administrator or user at the CAP location (station set ST1) has selected system administration or station administration (i.e., station programming). When the CU mode select switch is in the security mode position, a user at the CAP location going into the program mode (switch 201 set to program position) will only be able to do station programming. When a user sets the CU mode select switch in the administration mode position, a user at the CAP location will be able to do system administration.

SYSTEM ADMINISTRATION

Assume that the user does set the CU mode switch to the administration position in 401 and sets the CAP telephone mode switch to program mode, 402. The result is that a switch mode command is sent from TA 303-1 to TM 302-1 indicating that station ST1 is to be placed in the program mode. In response TM 302-1 sends an administration command to ATD 311 requesting to enter the system administration mode. The ATD checks the status of the CU mode switch via translation manager 314 and translation adapter 313. If the CU mode switch is in the security position the normal station programming mode is initiated 417. Since we assumed that the CU mode switch was in the administration position, the ATD accepts the stations's request to go into administration mode and the station enters the system administration mode, 404. In 404 the TMA, 312, receives an administration begin command from the TM and sends a command to TA 303-1 to clear all of the LEDs at station ST1. Thereafter TMA 312 sends commands to TA 303-1 which causes the red and green LEDs to alternately flash at the ADM POOL (202), ADM STA (203), ADM MISC (204), TOLL (205) and NGHT SRV (206) buttons of station ST1. These flashing LEDs indicate to the user that the administration mode has been entered.

The administrator or user can activate any of the buttons 202-205 having the alternately flashing LEDs and thereby initiate one of the following features:

Pool Administration (ADM POOL) which allows the system administrator to put lines into and take them out of a specified system pool. Each system pool represents an anonymous set of lines that can be assessed from a station for both originating and receiving calls.

Station Administration (ADM STA) allows the system administrator to specify which lines (and pools) will appear at a user's station set, which pools a user can access through dial access to pools (External System Access) and what form of dial restriction applies to that user.

Toll Environment Administration (TOLL) allows the system administrator to select a 0/1 Toll environment (1 digit or 2 digit) for each line in the system.

Night Service Administration (NGHT SRV) allows the system administrator to associate one or none of the three external alert devices with each facility in the system.

Miscellaneous Administration (ADM MISC), just as the name implies, allows the system administrator to perform various miscellaneous forms of administration. The types of administration which may be performed in this mode include: maintenance of system speed dial numbers, maintenance of allowed lists, station access to allowed lists, telephone page zones, direct calling groups and SMDR options.

Note, had the user pressed other than one of the buttons (202-205) described above, the system would output an audible error tone. Note, the description of the present invention is best understood by describing the operation of the ADM STA or ADM POOL modes. The TOLL, NGHT SRV and ADM MISC modes operate in a similar manner, but the details are not required to understand the present invention.

STATION ADMINISTRATION

In the description that follows, we will assume that station administration mode is to be entered. To enter station administration mode, the user would press, step 405, the ADM STA button 203 to initiate this mode. In response, 406, the ATD would cause the red LEDs next to lines in the pool and green LED, 403G, next to the ADM STA button 203 to turn-on at station ST1. These two steps 405 and 406 are accomplished when terminal adapter 303-1 calls TM 302-1 and indicating that the user at station ST1 has pressed the ADM STA button 203. In response TM 302-1 calls TMA 312 with the ADM STA button information. The TMA 312 module goes through an administration state table FIG. 7 and finds a match for the received stimulus ADM STA and thereafter enters the station administration mode. The TMA 302-1 then issues commands to TA 303-1 to turn-off the red and greed flashing LEDs at station ST1. Thereafter, TMA asks the ATD, 311, which lines are in the system pool. The ATD checks each CO facility in the system using table 602 to determine if that line is in any system pool (e.g., a dial 9 pool). Then TMA 302-1 commands TA 303-1 to light the red LEDs adjacent to lines determined to be in the system pool as well as the green LED adjacent to the ADM STN button 203 at station ST1.

In step 407 the user or administrator enters the digits of a station number or presses the appropriate direct station select (DSS) button. If the user dials the station number, TM 302-1 receives from TA 303-1 the station number a digit at a time and calls TMA 312 with this information. The TMA 312 asks the ATD to check the station number (SID) in a dialed digit translation table (not shown) and if valid gets a translated station number (SID). Once a valid station has been selected, either via dial pad or a DSS button, the TMA asks the ATD to put the specified station into a planned Forced Idle Mode. The ATD then asks the appropriate TM to put itself into planned Forced Idle Mode. The TM and ATD set both a forced idle planned (FIP) bit in their respective station status table 604. If an invalid station number had been dialed, an audible error tone signals the user of this face.

Assuming that a valid station number was entered, the user has completely initiated station administration at the selected station. In response the TMA asks the ATD which lines and pools the specified station can access. The TMA also asks the ATD, step 408, if the station is presently busy. The ATD also determines, step 408, if the station is presently busy on any lines.

If the selected station is busy, step 409, the TM associated with that station notes that the FIP bit is set in the station status table 604 for that station, and will prevent that station from initiating any additional operations after the conclusion of the present station operation. Finally, TA 303-1 is commanded to turn on the green LEDs next to lines which this station can access. Additionally TA 303-1 is commanded to flash the green LEDs of the ADM STA button and the station button on the DSS unit. The ATD also cancels the forced idle state from any previously administered station. The TM and TA associated with that previously administered station turns off the forced idle tone and restores the normal station visuals, and enables normal telephone operations again at that station.

When the station to be programmed is busy, the user or administrator must decide, step 410, either to wait for the selected station to become idle, 408, or to select another station, 420, to program. A selected station is busy during the ADM STA mode when that station is off-hook, has a call on hold, is in the program mode, or the station has transferred a call and the transferred call is not yet answered. If the user decides to wait, the sequence of steps 408, 409, 410 continues until the selected station finally becomes idle, step 411. At that time, step 411, the user is alerted by both a forced idle (FI) tone and the transition from flashing green LEDs at the ADM STA and DSS buttons at station ST1 to the steady on state.

The selected station to be administered becomes idle by going on-hook, etc. as described in a later paragraph. In response the associated TA calls the associated TM which checks the status table and detects that the forced idle planned bit (FIP) is set. The TM resets the FIP bit and sets the FI bit at the associated station status table 604. The TM calls the ATD and signals that the selected station to be programmed is now idle and ATD signals, step 411, TMA 312 and TA 303-1 to generate the above-described visuals and audibles at station ST1. The TM also sends commands, 412, to the associated TA to clear all LEDs at selected station and to output a periodic forced idle tone.

When the selected station is idle, the system administrator or user can remove lines from or assign lines to a station by depressing the appropriate line buttons (step 413A). Once the selected station is idle any number of changes can be made, 418. If a line button is depressed, the state of the associated LED next to that line will toggle, accordingly (414A). Depressing an unlit line button will cause that line to be assigned to and appear at the station currently being administered. Note, accordingly the green LED next to that line button will light steady. The assigned line will appear at the user's station set according to a predefined algorithm described in ROM 108 of common controller 100. Depressing a lit line button will cause that line to be removed from the station currently being administered and hence the associated green LED will go off. The sequence of calls and commands between TA 303-1, TM 302-1, TM 312 and ATD 311 required to perform these functions proceed in a manner identical to that previously discussed to detect button depression, to light the appropriate LEDs, and to update the station/line table 603.

The administrator can also perform the following Direct Access to Pools administration for the station currently being administered. Direct access to a pool can be assigned or removed by depressing the line button (step 413B) associated with any line in that pool. Depressing the button associated with a line in a pool will toggle the user's access to that pool. The green LEDs next to all lines in any pool will always change as a group (414B). It will not be possible to give a user access to any line in a pool without giving that user access to all other lines in that pool.

The dial restriction for the currently administered station can also be changed by depressing the TOLL button (step 413C). On each depression, the green LED next to the TOLL button will cycle between the three states steady, flashing, and off (step 414C).

Personal Lines can be assigned by assigning a line to a single user's station set and removing the line from all other users (if present).

The administrator can administer another station, step 415, by depressing the associated DSS button (if equipped) or keying the new station number on a dial pad. The facility access and dial restriction information of the previous station being administered is retained at the CAP and that station is kept in Forced Idle state until the administrator specifies a new valid station (407) or exits Station Administration Mode (416). The administrator can exit Station Administration Mode by going into another administration mode (ex., by pressing buttons 402, 404, 405 or 406) or by going out of Program Mode (using switch 201 at CAP station ST1). When administrator exits, 416, the Station Administration Mode the system removes any station from the Forced Idle state and clears the FI bit in the associated station status table 604.

POOL ADMINISTRATION

In the description that follows, we will assume that Pool Administration is to be entered. To enter the Pool Administration mode, the user would press the ADM Pool button, step 418, following step 403. In response, step 501, the system clears all the LEDs at the CAP station ST1. The commands utilized are similar to those described in step 406. Note, if the system configuration shown in FIG. 1 is one button for each CO facility, there is no need for system pools and hence no need for ADM POOL administration. Assuming that the system is not square, the following sequence of operations occur during pool administration mode.

After step 501, TMA asks the ATD which lines are in the system pool. The ATD checks each CO facility (lines) in the system to determine whether that line belongs to the selected specified dial 9 pool using table 602. The TMA sends display messages, 503, to terminal adapter 303-1 to cause the red LED associated with each line in the pool to light steadily. The TMA also causes the green LED of ADM POOL button to flash at CAP station ST1. The TMA asks the ATD to put all stations into Forced Idle, and all lines into Forced Busy. The ATD in step 504, selects a station and asks that station's TM to set the forced idle planned (FIP) bit in that station status table, 604, and waits for that station set to become idle. The sequence of steps 504, 505 and 507 continues until each station set becomes idle.

During Pool Administration, an idle station is a station not having any calls active at that station. An active call is a call which this station has put on hold, transferred or is currently off-hook. During this Pool Administration Mode, alerting calls are considered active calls. Note that during Station Administration Mode, alerting calls are not considered active. A station in the programming mode is considered to be busy and a non-responding station is considered to be idle. Since the CAP is always in Program Mode during station or system administration, the definition of idle at the CAP does include the Program Mode. For the purpose of Forced Idle, calls on hold at the CAP are treated like any other station.

When a station becomes idle, 505, the terminal adapter (TA) for that station signals the associated terminal manager (TM) which checks for the FIP bit in the station status table. When the bit is set, as during this ADM POOL mode, the forced idle bit is set, 506, and FIP bit cleared, and the station set is locked out or prevented from operating. Each TM notifies the ATD when the FI condition is completed for its station set. When a station goes into the Forced Idle Mode, the station user is alerted by having all station visuals extinguished and by a unique periodic Forced Idle tone at the station. While in this mode, all station user button depressions are ignored. If the user switches the station into Program Mode while in Forced Idle, the change will be noted but not acted upon until leaving Forced Idle Mode.

Pool Administration requires that all stations of the system be idle (no active calls) as compared with Station Administration, which requires only that the administered station be idle. Additionally, Pool Administration requires that all lines in the system be put into a Forced Busy State. No other administration modes (i.e., ADM MISC, TOLL, and NGHT SRV) require all the stations of the system to be idle. If during the Pool administration these conditions are not met, a wait indication (flashing green ADM POOL mode LED), appears at the CAP station set ST1. This administration wait state continues until all the stations are in the FI state and all the CO lines are on the FB state.

While this wait indication is active, all button depressions at the CAP location that attempt to modify the pool specified are ignored. The administrator must wait for all stations in the system to become idle 509 or if desired can exit the mode, 507 and 508, in which case all stations are removed from the FI state and all busy CO lines are removed from the FB state. If the administrator terminates system administration before leaving the Administration Wait state the TMs in the FI state are released and all other TMs are notified that they should no longer report the busy to idle transition to the ATD.

After all station sets of the system become idle, 509, the ATD requests the LM to busy all CO facilities. The LM proceeds to select idle CO facilities, 510, and place them in the forced busy (FB) state, 512. As each line goes busy the LM sets the forced busy (FB) bit to logic 1 in the appropriate CO line status table, 605. This is accomplished using communications between the appropriate line adapter (LA) 308-1 through 308-M and its associated line manager 307-1 through 307-M. If user exits Pool Administration before all CO lines are idle then steps 511, 520 and 508 follow. When all CO facilities are in the Forced Busy State, the ATD is notified.

The purpose of forced busy (FB) state is to prevent outside people from calling into the system while Pool Administration is in progress, and getting a ringback signal. (Thus thinking that no one is present to answer the call.) Instead, the outside callers receive a busy signal and know that the CO lines are busy and will try again later. Thus, the signal returned to the caller is representative of the actual existing condition.

This process of busying-out CO lines continues (510, 511, 512, 513) until all CO lines of the system (i.e., CO1–COM) become idle and are placed in the Forced Busy state. When all lines in the system are in Forced Busy state and all stations in the system are in Forced Idle state the green LED at CAP station ST1 will go steady, 514, and a system idle audible alert tone is given to the user or administrator.

This is accomplished when the ATD receives the information that all CO lines are busy and in response sends TMA 312 a system idle command. The TMA 312 then sends the appropriate commands to TA 303-1 to cause the green LED to go steady and to output the system idle audible alert tone. The CAP station ST1 is thus out of the administration wait state and the administrator can now change the contents of various pools.

If the administrator wishes to administer another pool then the administrator enters the new pool number, in step 515, a digit at a time. The TA 303-1 receives these digits and sends them to TM 302-1 and TMA 312. The TMA 312 checks with the ATD to determine if the dialed number is a valid pool number. If an invalid pool number is entered an error tone is output at CAP station ST1. When a valid pool number is entered TMA 312 gets the CO lines associated with that pool code from table 602 and sends commands to TA 303-1, in step 516, to light the red LED next to each CO line in the selected pool.

The administrator can now add CO lines to the pool or delete lines from the pool. By pressing a line button, 517, next to a line already in the pool, as designated by a red LED which is on, that line is removed from the pool. Conversely, if the line button pressed, 517, is associated with a line not in the pool, as designated by a red LED which is off, that line is added to the pool. This is implemented by TA 303-1 reporting the button identification to TM 302-1 and TMA 312 which then appropriately deletes or adds the line to the pool in table 602. Then TMA 312 commands TA 303-1, step 518, to toggle the red LED next to the line button pressed.

Figure 6:
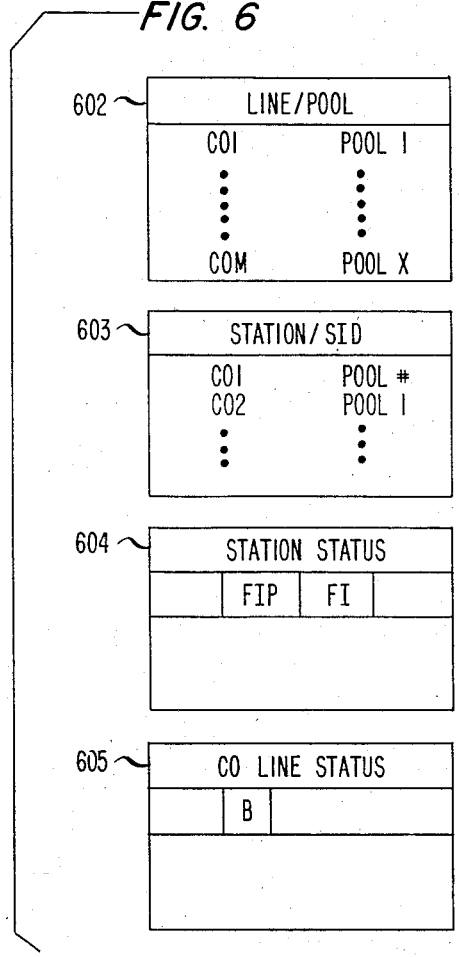

Thereafter, the administrator can select another pool number and add lines to or delete lines from that pool, step 519, or can decide to exit the ADM POOL mode, step 508. If the administrator exits the ADM POOL mode by pressing the station mode switch, the TA 303-1 signals TM 302-1, TMA 312 of this request. In response, TMA sends a cancel force idle and a cancel CO line busy commands to each of TM 302-1 through 302-N and LM 307-2 through 307-M, respectively. The TMA then requests the ATD to update the tables of FIG. 6. The TMA then returns all LEDs at the CAP to the normal condition using commands sent to the TA (303-1 to 303-N). The system and stations sets are now available for normal communications.

What has been described is merely illustrative of our invention, other embodiments known to those skilled in the art could be utilized without departing from the spirit and scope of the present invention. For example, other arrangements of audible or visual alerting signals or tones associated with the various modes can be utilized without deviating from our invention. Additionally, applications to other apparatus of a telephone or other communication systems other than the disclosed system are contemplated as being within the knowledge of one skilled in the art.

What is claimed is:

1. A communication system including a common controller unit connected to a plurality of communication apparatuses for controlling communicating over a plurality of communication facilities and further including an arrangement for administrating a communication connection between said apparatuses and said facilities, said system comprising,
   apparatus interface means responsive to control signals from said administrating arrangement for enabling and disabling communications to a connected apparatus,
   said administrating arrangement including
   means responsive to a user input for initiating an administration mode to change a connection between a selected facility and a selected connected apparatus designated by said user input and for terminating said administration mode after said change is completed,
   means responsive to an initiated administration mode and to an idle condition at said selected apparatus for sending a disable control signal to an interface means associated with said selected apparatus, and
   means responsive to said user input for sending an enable control signal to the interface means associated with said selected apparatus after said change is completed.

2. The communication system of claim 1 wherein said initiating and terminating means includes
   means for receiving a first user input for initiating said administrating arrangement at connected apparatus selected by said first user input; and
   means for receiving a second user input for designating said selected facility connection to be changed.

3. The communication system of claim 1
   wherein said apparatuses includes terminal apparatus and facility apparatus, and
   wherein said apparatus interface means includes
   a terminal apparatus interface means responsive to a forced idle disable control signal for disabling said terminal apparatus when said terminal apparatus becomes idle and for maintaining an idle condition thereafter, and
   a facility apparatus interface means responsive to a forced busy disable control signal for disabling said facility apparatus when said facility apparatus becomes idle and for placing it in a busy condition thereafter.

4. The communication system of claim 3
   wherein said user input initiates administration at said terminal apparatus.

5. The communication system of claim 1 wherein said initiating and terminating means includes
   means for selecting a system administration mode at said controller unit, and
   means for selecting a programming mode at said terminal apparatus, and wherein
   said initiating and terminating means is responsive to the user first operating said administration mode selecting means and then operating said programming mode selecting means.

6. The communication system of claim 1 wherein said initiating and terminating means is responsive only to said user input from a preselected control terminal apparatus.

7. The communication system of claim 1 wherein said administrating arrangement further includes means for sending an audible control signal in response to said idle condition at said terminal apparatus, and said terminal apparatus includes means responsive to said audible control signal for generating an audible signal thereat.

8. The communication system of claim 1 wherein said administrating arrangement further includes means for sending a visual control signal in response to said idle condition at said terminal apparatus, and said terminal apparatus includes means responsive to said visual control signal for generating a visual signal thereat.

9. The communication system of claim 1 wherein said administrating arrangement further includes means responsive to said user input for sending a visual control signal to said controller unit, and said controller unit including means responsive to said visual control signal for generating a visual signal thereat.

10. The communication system of claim 1 wherein said administrating arrangement further includes means responsive to the sending of said disable control signals to said communication apparatuses for sending a audible control signal to said controller unit, and said controller unit including means responsive to said audible control signal for generating an audible signal thereat.

11. The communication system of claim 1 wherein said administrating arrangement further includes means responsive to the sending of said disable control signals to said communication apparatuses for sending a visual control signal to said controller unit, and said controller unit including means responsive to said visual control signal for generating a visual signal thereat.

12. The communication system of claim 1 wherein said administrating arrangement further includes means responsive to said idle condition at said selected apparatus for sending an audible control signal to said selected apparatus, and said selected apparatus is responsive to said audible control signal for generating an audible signal to a user attempting to use a disabled apparatus.

13. The communication system of claim 1 wherein said communication apparatus is terminal apparatus, and wherein said user input initiates administration at said terminal apparatus.

14. The communication system of claim 13 wehrein said initiating and terminating means includes means for selecting a programming mode at said terminal apparatus.

15. The communication system of claim 13 wherein said initiating and terminating means is responsive only to a user input from a preselected terminal apparatus.

16. In a communication system including a common controller unit connected to a plurality of communication apparatuses for controlling communicating over a plurality of communication facilities, a method of administrating communication connections between said apparatuses and said facilities, said method comprising the steps of:

initiating administration at apparatus selected by a user input, disabling communications to said selected apparatus when said apparatus becomes idle, changing the connection of said selected apparatus to a facility selected by said user input, and enabling communications to said selected apparatus after said changing step is completed.

17. The method of claim 16 wherein said initiating step is in response to a first user input and said changing step is in response to a second user input.

18. The method of claim 16 wherein said apparatuses include terminal apparatus and facility apparatus and wherein said user input selects all of said terminal apparatus for administration.

19. The method of claim 16 further comprising the step of sending a status audible control signal to said selected apparatus during said disabling and changing steps.

20. The method of claim 16 further comprising the step of sending a status visual control signal to said selected apparatus during said disabling and changing steps.

* * * * *

UNITED STATES PATENT AND TRADEMARK OFFICE
CERTIFICATE OF CORRECTION

PATENT NO. : 4,629,832

DATED : December 16, 1986

INVENTOR(S) : Robert A. Carson, Mary S. Petrick, Lee A. Vallone, and John D. Walker It is certified that error appears in the above-identified patent and that said Letters Patent is hereby corrected as shown below:

Column 7, line 68, "face" should read --fact--. Column 12, line 42, "includes" should read --include--; line 58, "wherein said" should read --wherein said apparatuses include terminal apparatus and facility apparatus, and wherein said--. Column 13, line 5, "wherein said" should read --wherein said apparatuses include terminal apparatus and facility apparatus, and wherein said--; line 14, "wherein said" should read --wherein said apparatuses include terminal apparatus and facility apparatus, and wherein said--; line 32, "signals" should read --signal--; line 32, "communication apparatuses" should read --interface means--; line 33, "a" should read --an--; line 41, "signals" should read --signal--; line 41, "communication apparatuses" should read --interface means--. Column 14, line 6, "communication" should read --connected--.

Signed and Sealed this

Tenth Day of March, 1987

*Attest:*

DONALD J. QUIGG

*Attesting Officer*    Commissioner of Patents and Trademarks